UNITED STATES PATENT OFFICE.

FAY EDWARD POSSON, OF PARK RIDGE, ILLINOIS, ASSIGNOR TO SAFETY FIRST MANUFACTURING CO., OF CHICAGO, ILLINOIS, A CORPORATION OF ILLINOIS.

PAINT-REMOVING COMPOUND AND PROCESS OF MAKING THE SAME.

1,223,518.  Specification of Letters Patent.  Patented Apr. 24, 1917.

No Drawing.  Application filed June 12, 1916.  Serial No. 103,093.

*To all whom it may concern:*

Be it known that I, FAY E. POSSON, a citizen of the United States, residing at Park Ridge, in the county of Cook and State of Illinois, have invented certain new and useful Improvements in Paint-Removing Compounds and Processes of Making the Same, of which the following is a specification.

My invention relates to a composition of matter for removing paint, varnish, oil stains, or the like, from wood, metal, stone or other surfaces and process of making the same.

The principal object of the invention is to provide a compound of this type which can be conveniently and economically manufactured, which will accomplish the removal of the paint or other coating effectively and quickly without injury to the surface acted upon, and which will not deteriorate when kept for a considerable time even though exposed to the air.

A further object is to provide a paint or varnish removing compound which will have sufficient body and adhesiveness so that it will remain upon a vertical surface when applied thereto.

The compound of my invention is composed of a caustic alkali, water, silicate of soda, and an organic substance, preferably starch, to give the compound a gelatinous or pasty consistency and to increase its capacity to adhere to the surfaces to which it is applied. It is also possible to employ a small amount of bleaching powder in the compound.

In manufacturing the compound I proceed as follows: Four pounds of commercial lye or caustic soda is mixed with approximately one-half gallon of boiling water. Then two ounces of corn starch is first mixed with a little cold water taken from another half gallon, pasted and then added to the remainder of such half gallon which should be boiling hot. The starch is mixed in with the boiling water and lye, care being taken to stir the mixture so that the starch will not lump any more than is necessary. I then add one-half gallon of silicate of soda while the first mix is still hot. If bleaching powder is used it may be stirred into the mixture and the whole allowed to stand until it cools. It is then stirred or ground in any suitable mill and the resultant product is a smooth paste gelatinous and somewhat adhesive in its consistency and translucent in appearance. The compound will keep these characteristics for some little time even though exposed to the air. In fact the pasty character of the compound is permanent for all intents and purposes as it will keep in this way several months at least. If, after a time, it thickens it may be thinned down by adding water.

The compound is applied to the surface to be treated preferably by a brush or spray and is allowed to remain for a period of from ten minutes to two or three hours, depending upon the character of the coating to be removed. It is then washed off, carrying with it the paint, varnish or other coating which it is intended to remove. If the compound is allowed to remain on the surface treated until it hardens it is desirable to wet it up with a spray before starting to wash it off.

I claim:

1. A compound for removing paint or similar coatings formed by mixing together a caustic alkali in sufficient quantity to constitute the active agent in the compound with water, silicate of soda and starch in proportions to form a pasty substance.

2. A compound for removing paint or similar coatings formed by mixing together a caustic alkali with water, silicate of soda and a mucilaginous substance in proportions which make the compound permanently pasty and adhesive in its consistency.

3. A compound for removing paint or similar coatings formed by mixing together the following ingredients in substantially the proportions as follows: four pounds of commercial lye or caustic soda with one gallon of water, two ounces of corn starch and one-half gallon of silicate of soda.

4. The method of manufacturing a composition of matter for removing paint and similar coatings which consists in boiling a caustic alkali in water, mixing therewith while boiling corn starch wet up so as to form a paste, adding silicate of soda, then allowing the compound to cool, and when cool stirring the same to form a smooth paste.

5. The method of manufacturing a composition of matter for removing paint or similar coatings which consists in boiling four pounds of commercial lye or caustic soda with approximately one-half gallon of water, mixing into the boiling water and alkali two ounces of corn starch reduced to a paste with a small amount of water taken from said half gallon, adding one-half gallon of silicate of soda, then allowing the composition to cool, and thereafter stirring the same to make a smooth paste.

6. The method of manufacturing a composition of matter for removing paint and similar coatings, which consists in mixing together and heating a caustic alkali, silicate of soda, water, and a mucilaginous substance, allowing the same to cool and when cool stirring the same to form a smooth paste.

FAY EDWARD POSSON.

Copies of this patent may be obtained for five cents each, by addressing the "Commissioner of Patents. Washington, D. C."